United States Patent
Inoue (10) Patent No.: US 8,243,650 B2
(45) Date of Patent: Aug. 14, 2012

(54) ACCESS POINT DEVICE FOR WIRELESS LAN AND METHOD OF SECURING COMMUNICATION PATH

(75) Inventor: Seiichi Inoue, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 602 days.

(21) Appl. No.: 12/409,949

(22) Filed: Mar. 24, 2009

(65) Prior Publication Data

US 2009/0245163 A1 Oct. 1, 2009

(30) Foreign Application Priority Data

Mar. 25, 2008 (JP) ................................. 2008-078002

(51) Int. Cl.
*H04B 7/14* (2006.01)

(52) U.S. Cl. ........ 370/315; 370/338; 370/355; 370/401; 709/238; 726/12; 726/27; 455/422.1

(58) Field of Classification Search .................. None
See application file for complete search history.

(56) References Cited

U.S. PATENT DOCUMENTS

| | | | | |
|---|---|---|---|---|
| 2003/0212738 | A1* | 11/2003 | Wookey et al. | 709/203 |
| 2006/0075114 | A1* | 4/2006 | Panasyuk et al. | 709/227 |
| 2006/0248194 | A1* | 11/2006 | Ly et al. | 709/226 |
| 2007/0183404 | A1* | 8/2007 | Hofer | 370/352 |

FOREIGN PATENT DOCUMENTS

| | | |
|---|---|---|
| JP | 05-091093 A | 4/1993 |
| JP | 9-214545 A | 8/1997 |
| JP | 2003-152732 A | 5/2003 |
| JP | 2004-072198 A | 3/2004 |
| JP | 2005-064711 A | 3/2005 |
| JP | 2005-176021 A | 6/2005 |
| JP | 2006-140874 A | 6/2006 |
| JP | 2007-150420 A | 6/2007 |

* cited by examiner

*Primary Examiner* — Chi H. Pham
*Assistant Examiner* — Shick Hom
(74) *Attorney, Agent, or Firm* — Sughrue Mion, PLLC (57) ABSTRACT

An access point device of a wireless LAN connecting a client device to a wired LAN: monitors a connection between the access point device and the wired LAN; transmits a portal request, to an adjacent access point device, indicating a request for serving as a proxy connection node accessing the wired LAN and implements a process as a relay node between the adjacent access point device and the client device, if the connection between the access point device and the wired LAN is not normal; and implements a process as a proxy connection node indicated by a portal request sent from the adjacent access point device, if the connection between the access point device and the wired LAN is normal where the access point device receives the portal request from the adjacent access point device.

12 Claims, 9 Drawing Sheets

ACCESS POINT DEVICE FOR WIRELESS LAN AND METHOD OF SECURING COMMUNICATION PATH

This application is based upon and claims the benefit of priority from Japanese patent application No. 2008-078002, filed on Mar. 25, 2008, the disclosure of which is incorporated herein in its entirety by reference.

TECHNICAL FIELD

The present invention relates to an access point device for a wireless LAN (Local Area Network).

BACKGROUND ART

There is known, as a technique related to connection between an access point device for a wireless LAN and a wired LAN, a technique described in, for example, Japanese Patent Application Laid-Open No. 05-091093. The technique disclosed in the Japanese Patent Application Laid-Open No. 05-091093 is intended to provide a switch (6) connecting to one of two wired LAN transmission lines (9 and 10) in a connection unit (1) corresponding to an access point. With a configuration of this technique, if a fault occurs on the connected wired LAN transmission line, the connection is switched over to a connection to the other transmission line.

SUMMARY OF INVENTION

However, it is practically difficult to allocate a plurality of wired LAN transmission lines to one access point as described in the Japanese Patent Application Laid-Open No. 05-091093. Furthermore, if those plural lines are connected to the same higher hub device and a fault occurs on this higher hub device, a communication from the access point via one wired LAN transmission line can not be eventually held.

It is, therefore, an object of the present invention to provide a technique for connecting a client device to a wired LAN even if a fault occurs on a path between an access point device and the wired LAN.

A method according to one aspect of the present invention is a method of securing a communication path of a client device by an access point device for a wireless LAN connecting the client device to a wired LAN, comprising: monitoring a connection between the access point device and the wired LAN; transmitting a portal request, to an adjacent access point device, indicating a request for serving as a proxy connection node accessing the wired LAN and implementing a process as a relay node between the adjacent access point device and the client device, if the connection between the access point device and the wired LAN is not normal; and implementing a process as a proxy connection node indicated by a portal request sent from the adjacent access point device, if the connection between the access point device and the wired LAN is normal where the access point device receives the portal request from the adjacent access point device.

An access point device according to another aspect of the present invention is an access point device of a wireless LAN connecting a client device to a wired LAN, comprising: a LAN monitoring unit monitoring a connection between the access point device and the wired LAN; a relay process unit transmitting a portal request, to an adjacent access point device, indicating a request for serving as a proxy connection node accessing the wired LAN and implementing a process as a relay node between the adjacent access point device and the client device, if the connection between the access point device and the wired LAN is not normal; and a portal process unit implementing a process as a proxy connection node indicated by a portal request sent from the adjacent access point device, if the connection between the access point device and the wired LAN is normal where the access point device receives the portal request from the adjacent access point device.

According to the present invention, even if a fault occurs on a path between an access point device and a wired LAN, a client device can be connected to the wired LAN.

DESCRIPTION OF EMBODIMENTS

Figure 1:
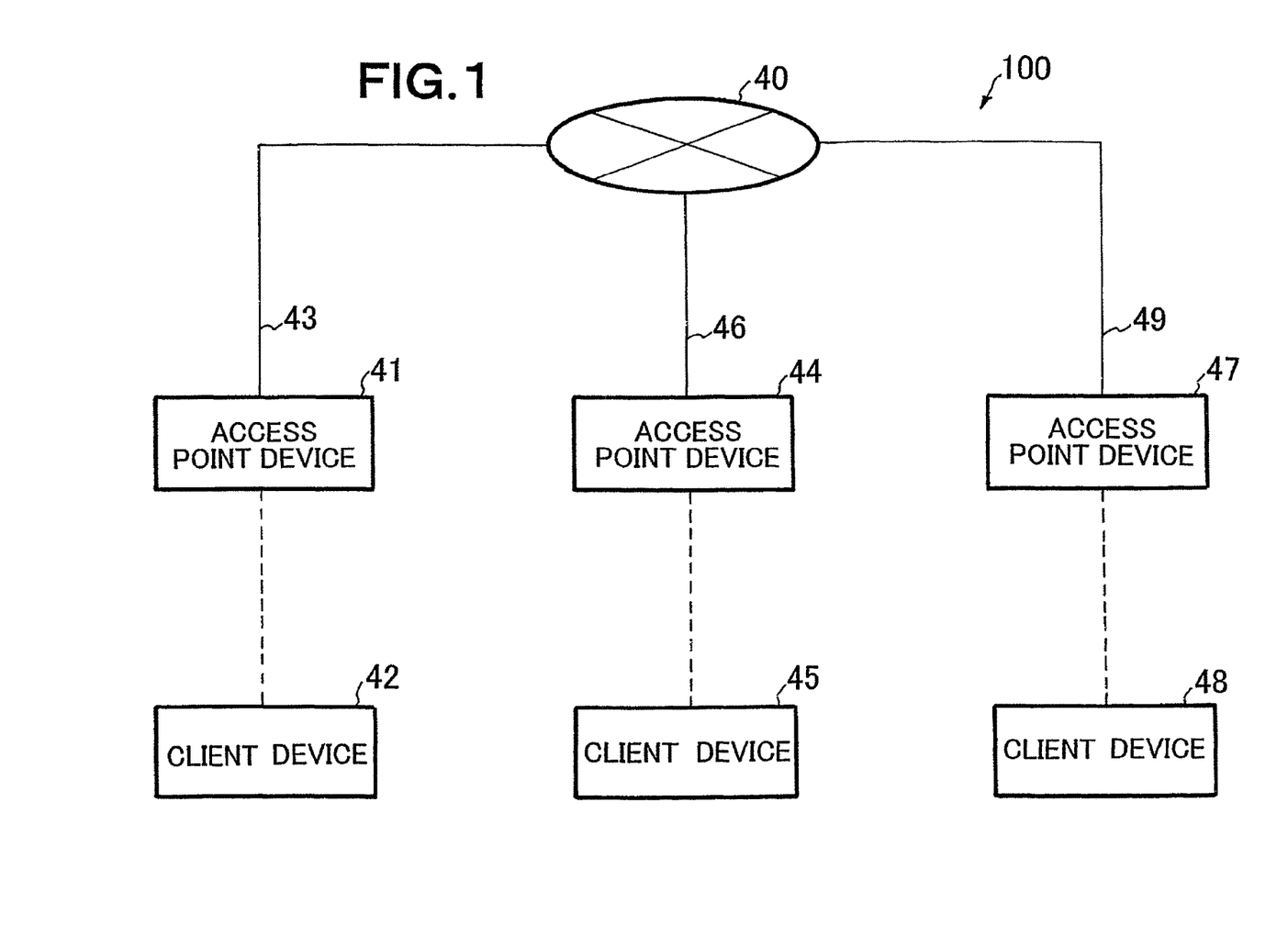
{FIG. 1} is a configuration diagram of a system according to an embodiment of the present invention.

FIG. 1 shows a configuration of a system according to an embodiment of the present invention. A system 100 according to the embodiment includes access point devices 41, 44 and 47 connected to a wired LAN infrastructure 40.

A client device 42 is connected to the access point device 41 and the access point device 41 is connected to the wired LAN infrastructure 40 via a path 43. A client device 45 is connected to the access point device 44 and the access point device 44 is connected to the wired LAN infrastructure 40 via a path 46. A client device 48 is connected to the access point device 47 and the access point device 47 is connected to the wired LAN infrastructure 40 via a path 49.

The access point devices 41, 44 and 47 are arranged to be able to hold wireless communication with one another, respectively. A highest field intensity that the access point device 41 detects is that of the access point device 44 and a second highest field intensity is that of the access point device 47. It is to be noted that each of the access point devices 44 and 47 corresponds to an adjacent access point device to the access point device 41 according to the present invention.

Figure 2:
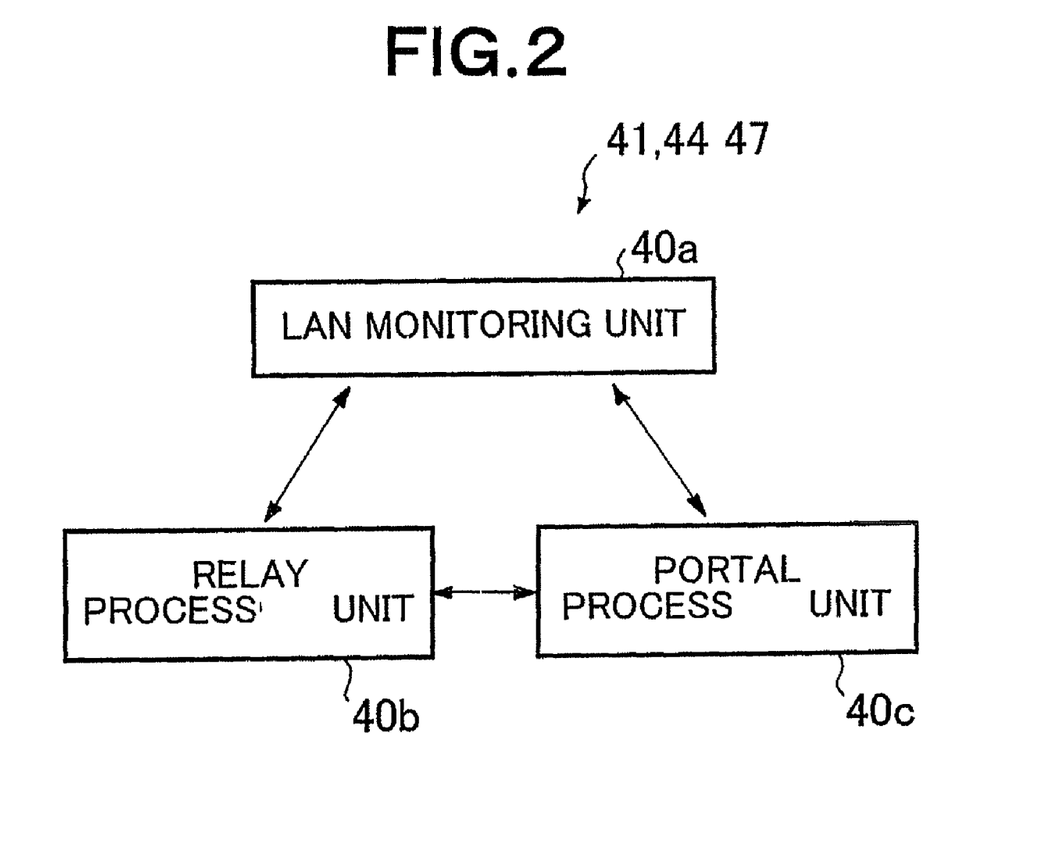
{FIG. 2} is a block diagram showing a functional configuration of an access point device according to the embodiment of the present invention.

FIG. 2 shows a functional configuration of each of the access point devices 41, 44 and 47. Each of the access point devices 41, 44 and 47 includes a LAN monitoring unit 40a, a relay process unit 40b and a portal process unit 40c. Functions of these constituent units 40a, 40b and 40c will be described while referring to the access point device 41 for the sake of convenience.

The LAN monitoring unit 40a of the access point device 41 includes a function of monitoring a connection between the access point device 41 and the wired LAN infrastructure 40, that is, monitoring whether or not a fault occurs on the path 43 and a function of monitoring field intensities of surrounding access point devices. The LAN monitoring unit 40a recognizes the access point devices with which the access point device 41 can appropriately hold wireless communication among the surrounding access point devices as adjacent access point devices.

The relay process unit 40b includes a function of serving as a mesh access point during occurrence of a fault to the path 43 and a function of transmitting a request the adjacent access point device 44 or 47 serve as a mesh access point portal to the adjacent access point device 44 or 47. The "mesh access point" corresponds to a relay node according to the present invention and the "mesh access point portal" corresponds to a proxy connection node. Furthermore, the "request of the mesh access point portal" corresponds to a portal request according to the present invention.

The relay process unit 40b implements a relay process for connection of the client device 42 to the wired LAN infrastructure 40 if the relay process unit 40b serves as the mesh access point (the relay node).

The portal process unit 40c responds to a portal request if a state of the path 43 is normal, when receiving the portal request from the adjacent access point device 44 or 47. That is, the portal process unit 40c implements a process as a requested proxy connection node. The proxy connection node is a node which accesses the wired LAN infrastructure 40 instead of the relay node.

(Description of Operation)

Figure 3:
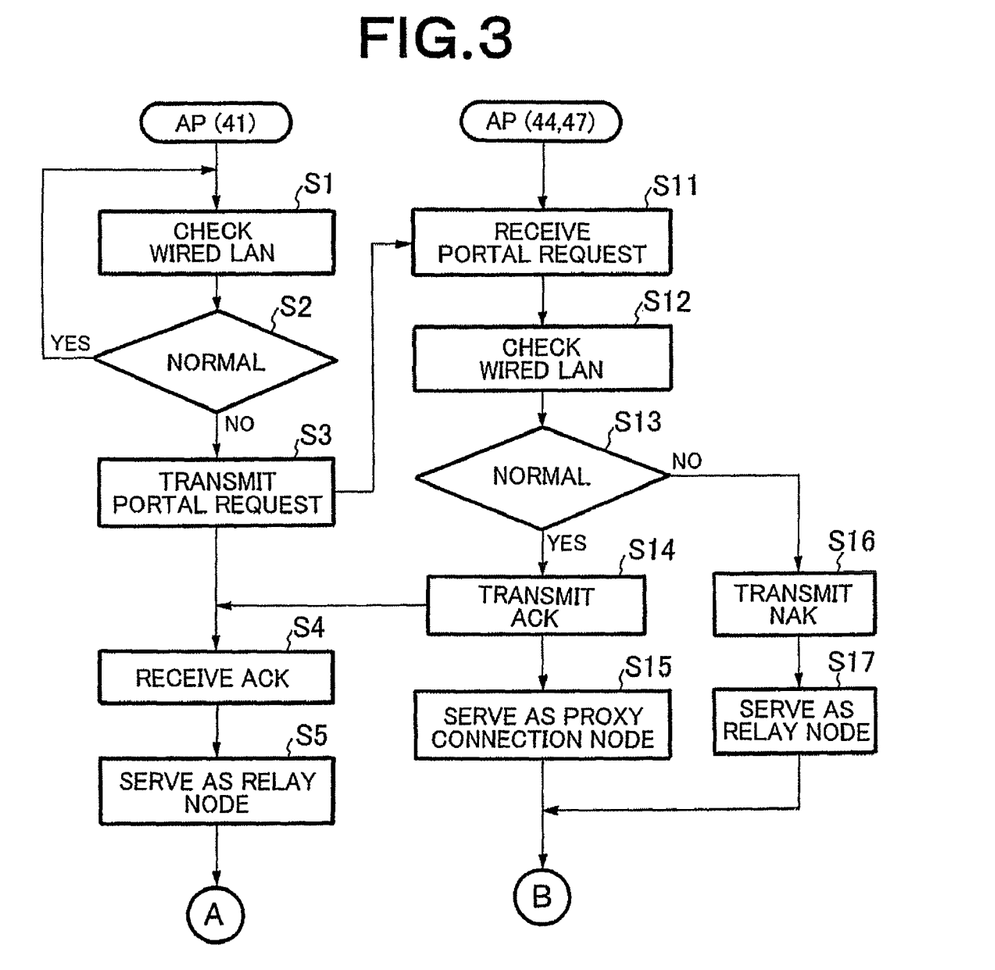
{FIG. 3} is a flowchart of operation related to a portal request according to the embodiment of the present invention.
Figure 4:
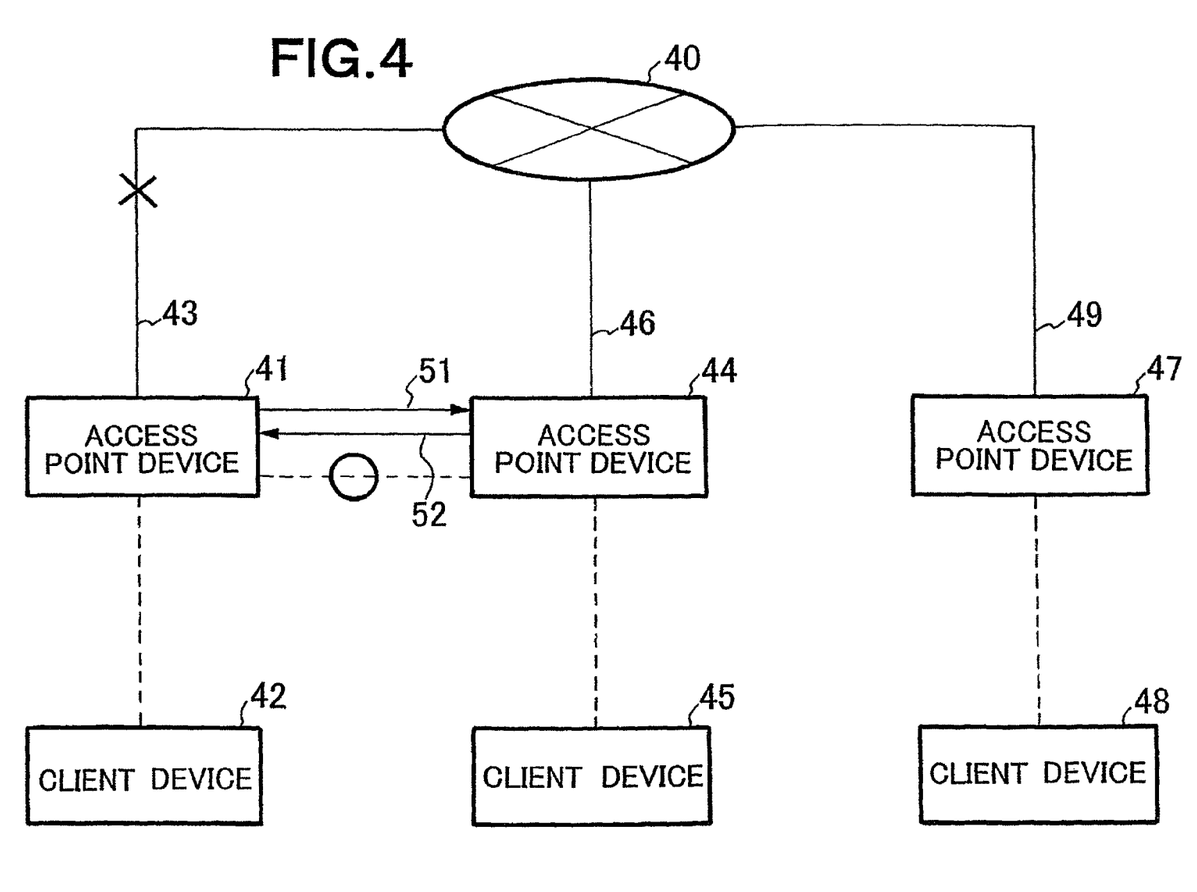
{FIG. 4} is an explanatory diagram of the operation related to the portal request according to the embodiment of the present invention.

Referring to the flowchart of FIG. 3 and to FIG. 4, an operation implemented by the access point device 41 related to a portal request will be described. The access point device 41 regularly checks a state of the path 43 (step S1). If detecting occurrence of a communication fault to the path 43 (step S2: No), the access point device 41 transmits a portal request 51 to the access point device 44 having the highest field intensity (step S3).

The access point device 44 that receives the portal request 51 (step S11) checks a communication state of the path 46 to which the access point device 44 is connected (step S12). If there is no fault in the communication state of the path 46 as a result of the check (step S13: Yes), the access point device 44 responds an acknowledgment (hereinafter, simply "ACK") 52 as acknowledge with respect to the portal request 51 to the access point device 41 (step S14).

The access point device 44 that transmits the ACK 52 serves as a mesh access point and implements a process as the proxy connection node (step S15). On the other hand, the access point device 41 that receives the ACK 52 (Step S4) implements a relay process between the client device 42 and the access point device 44 as the mesh access point, that is, the relay node (step S5).

As a result of the above-stated sequence, the communication between the client device 42 and the wired LAN infrastructure 40 is continuously held on a path from the client device 42 to the access point device 44 via the access point device 41.

Meanwhile, the client device 45 that is being connected to the access point device 44 responsible for the proxy connection node can continue communicating with the wired LAN infrastructure 40 via this access point device 44 as usual.

Figure 5:
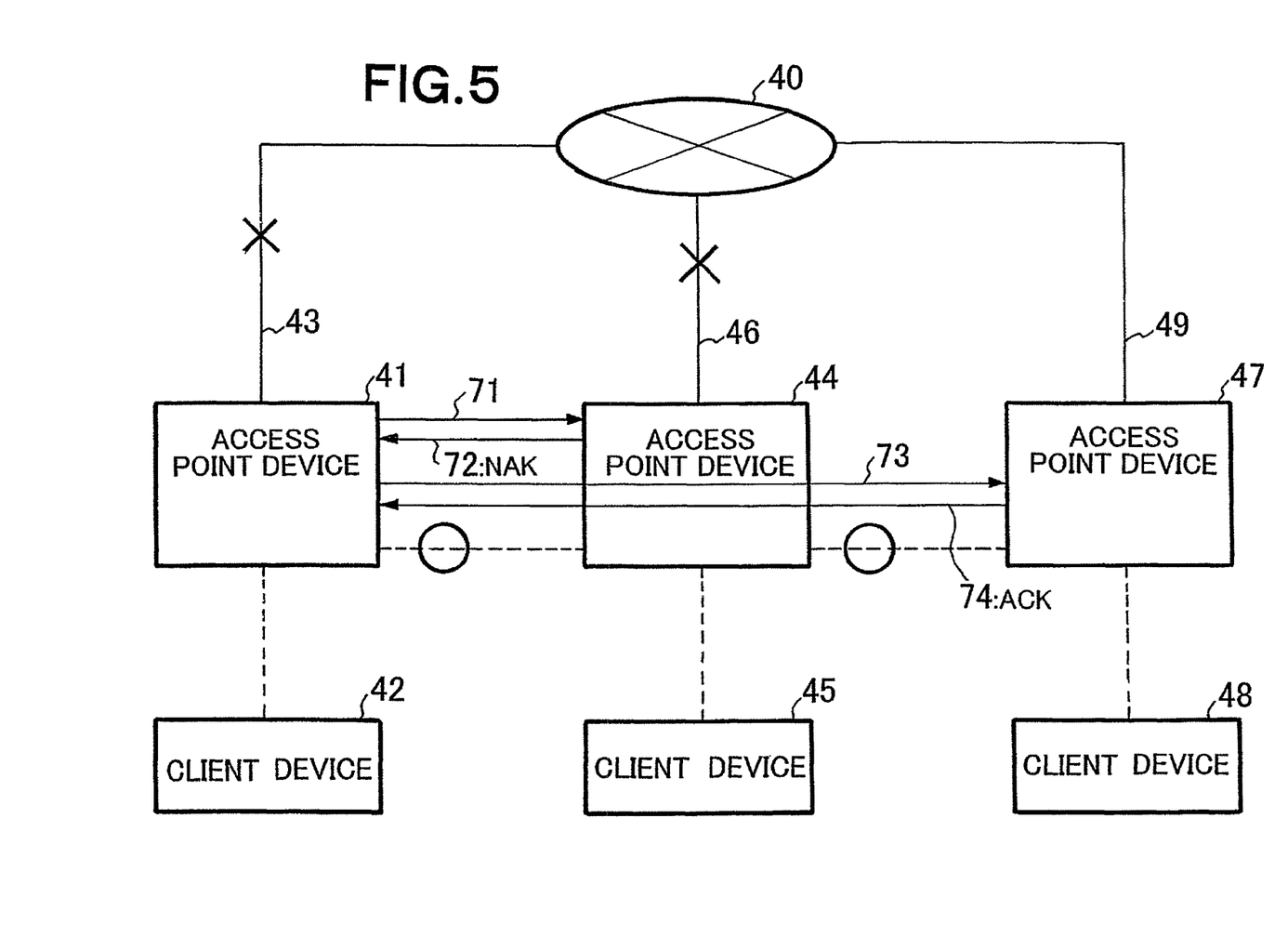
{FIG. 5} is an explanatory diagram of the operation related to the portal request according to the embodiment of the present invention.

Referring now to FIG. 5, an instance in which a fault also occurs on the path 46 connected to the access point device 44 that receives the portal request will be described. If detecting a fault on the path 46 when receiving a portal request 71 from the access point device 41 (step S13 in FIG. 3: No), the access point device 44 transmits a negative acknowledgment (hereinafter, simply "NAK") 72 to the access point device 41 as a negative acknowledge with respect to the portal request 71 (step S16 in FIG. 3). The access point device 44 that transmits the NAK 72 serves as a relay node between the client device 42 and the wired LAN infrastructure 40 similarly to the access point device 41.

On the other hand, the access point device 41 that receives the NAK 72 from the access point device 44 transmits a new portal request 73 to the access point device 47 having the second highest field intensity to the access point device 44. The access point device 47 that receives this portal request 73 checks a communication state of the path 49 to which the access point device 47 is connected. If no fault occurs on the communication state, the access point device 47 responds an ACK 74 to the access point device 41 as acknowledge with respect to the portal request 73.

The access point device 47 that transmits the ACK 74 serves as a proxy connection node. The access point device 41 that receives the ACK 74 is wirelessly connected to the access point device 44 that serves as the relay node similarly to the access point device 41. Furthermore, the access point device 44 is wirelessly connected to the access point device 47 that serves as the proxy connection node.

As a result, the client device 42 that is being connected to the access point device 41 can continue communicating with the wired LAN infrastructure 40 via the access point devices 41 and 44 serving as the relay nodes and via the access point device 47 serving as the proxy connection node.

The client device 45 that is being connected to the access point device 44 can continue communicating with the wired LAN infrastructure 40 via the access point device 44 serving as the relay node and via the access point device 47 serving as the proxy connection node.

The client device 48 that is being connected to the access point device 47 can continue communicating with the wired LAN infrastructure 40 via the access point device 47 as usual.

Referring to the flowchart of FIG. 6, an operation implemented by the system 100 if a wired LAN is restored from a fault will be described. Referring first to FIG. 7, an instance in which the path 43 to which the access point device 41 is connected is restored from a fault in a state in which the access point device 44 serves as a proxy connection node will be described.

The access point device 41 that serves as a relay node at present time monitors a state of the path 43 to which a fault occurs and to which the access point device 41 is connected (step S21). If detecting that the path 43 is restored from the fault (step S22: Yes), the access point device 41 transmits a recovery notification 61 to the access point device 44 so as to invalidating the portal request transmitted to the access point device 44 (step S23).

The access point device 44 that receives the recovery notification 61 (step S31) responds an ACK 62 with respect to the recovery notification 61 to the access point device 41 (step S32). While the access point device 44 serves as the proxy connection node (step S33: "proxy"), the access point device 44 stops a process as the proxy connection node on an occasion of transmission of the ACK 62 (step S34).

The access point device 41 that receives the ACK 62 (step S24) disables a wireless connection between the access points 41 and 44 (step S25) and stops a process as the relay node (step S26). As a result, the access point device 41 is restored to an operation state before occurrence of a communication fault to the path 43 to which the access point device 41 is connected.

Figure 8:
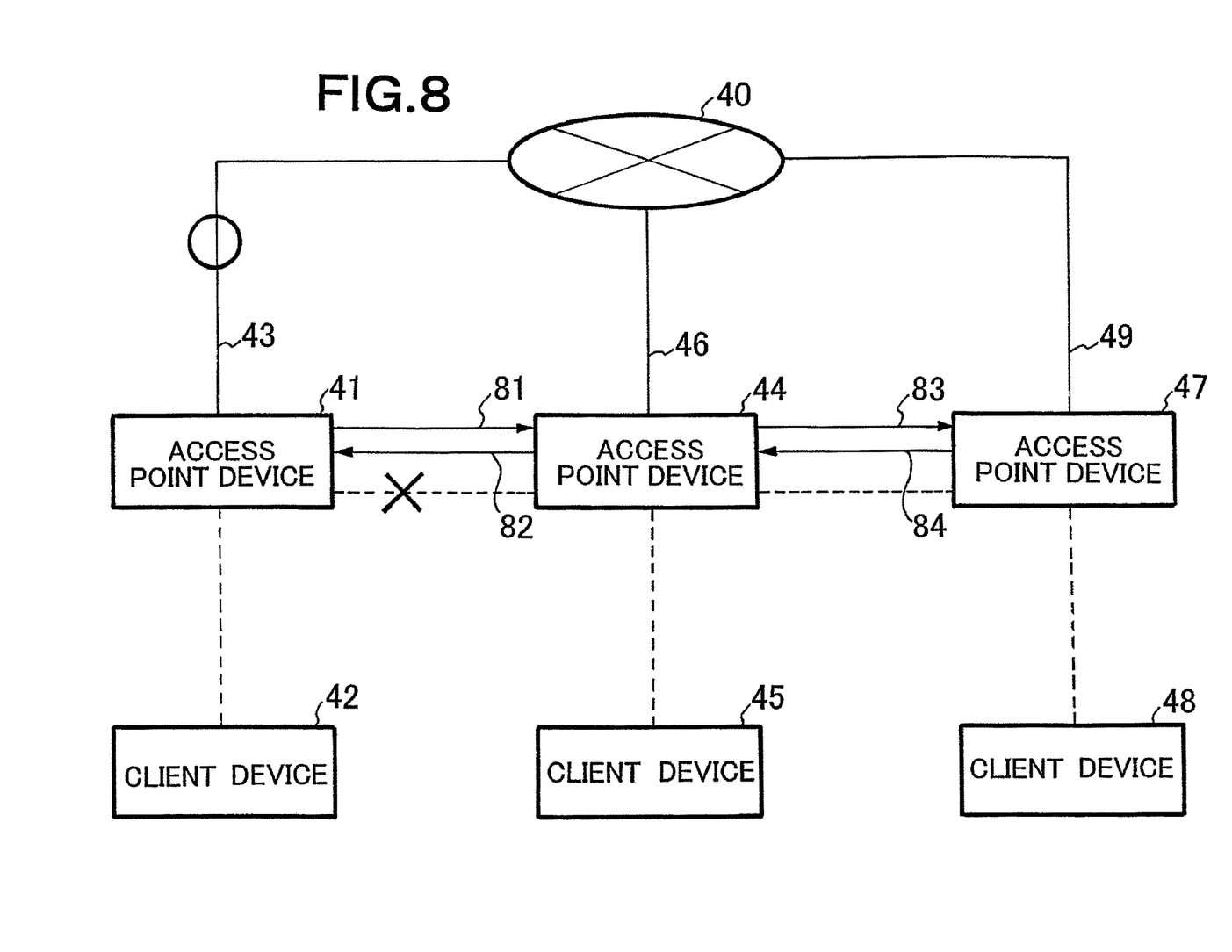
{FIG. 8} is an explanatory diagram of the operation related to the recovery notification according to the embodiment of the present invention.

Referring to FIG. 8, a recovery operation implemented by the system 100 if the access point devices 41 and 44 serve as relay nodes and the access point device 47 serves as the proxy connection node will be described. It is assumed herein that a recovery notification 81 and an ACK 82 with respect to the recovery notification 81 are communicated between the access point devices 41 and 44 similarly to the above-stated procedures as a result of recovery of the path 43 to which the access point 41 is connected.

Figure 6:
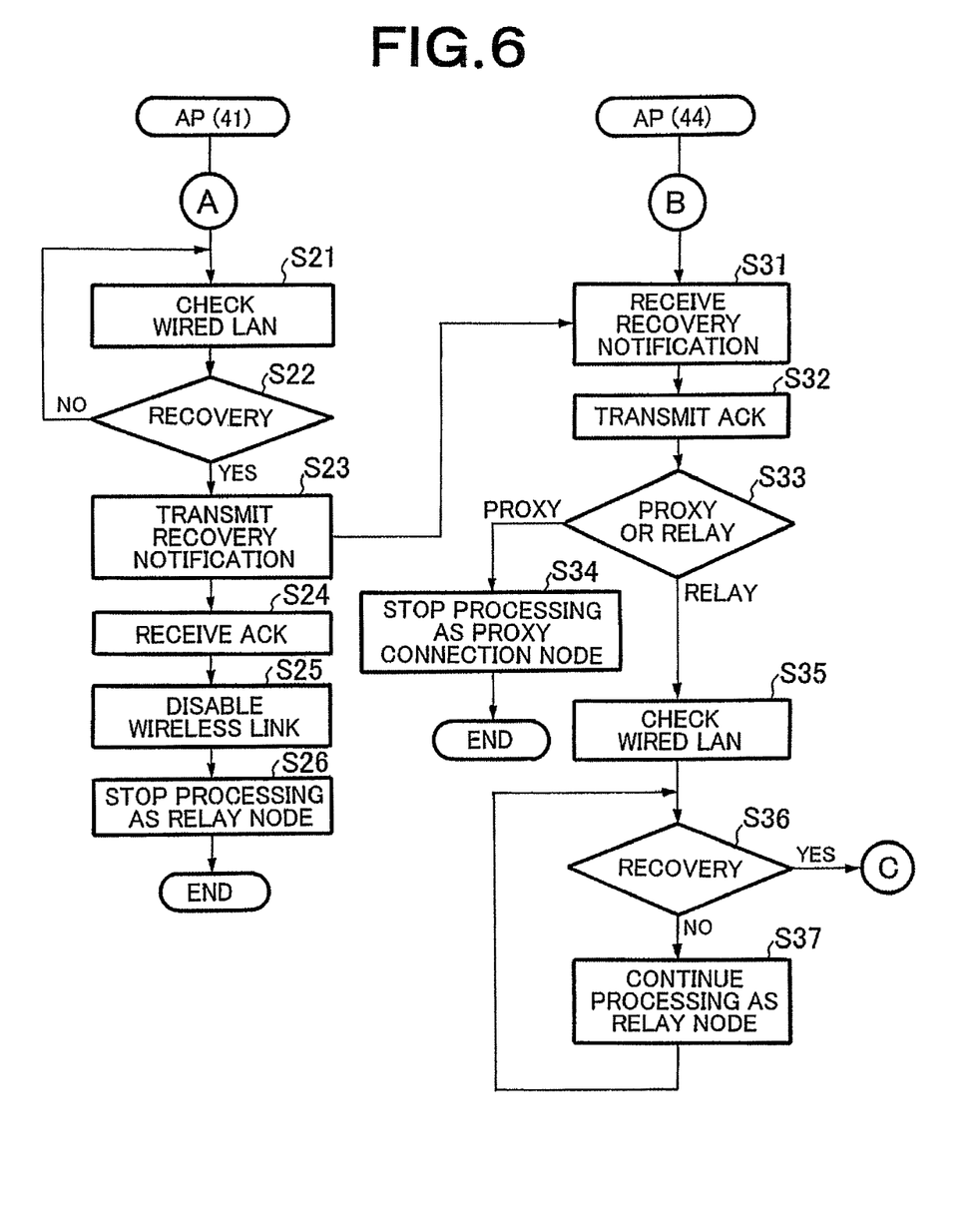
{FIG. 6} is a flowchart of an operation related to a recovery notification according to the embodiment of the present invention.
Figure 7:
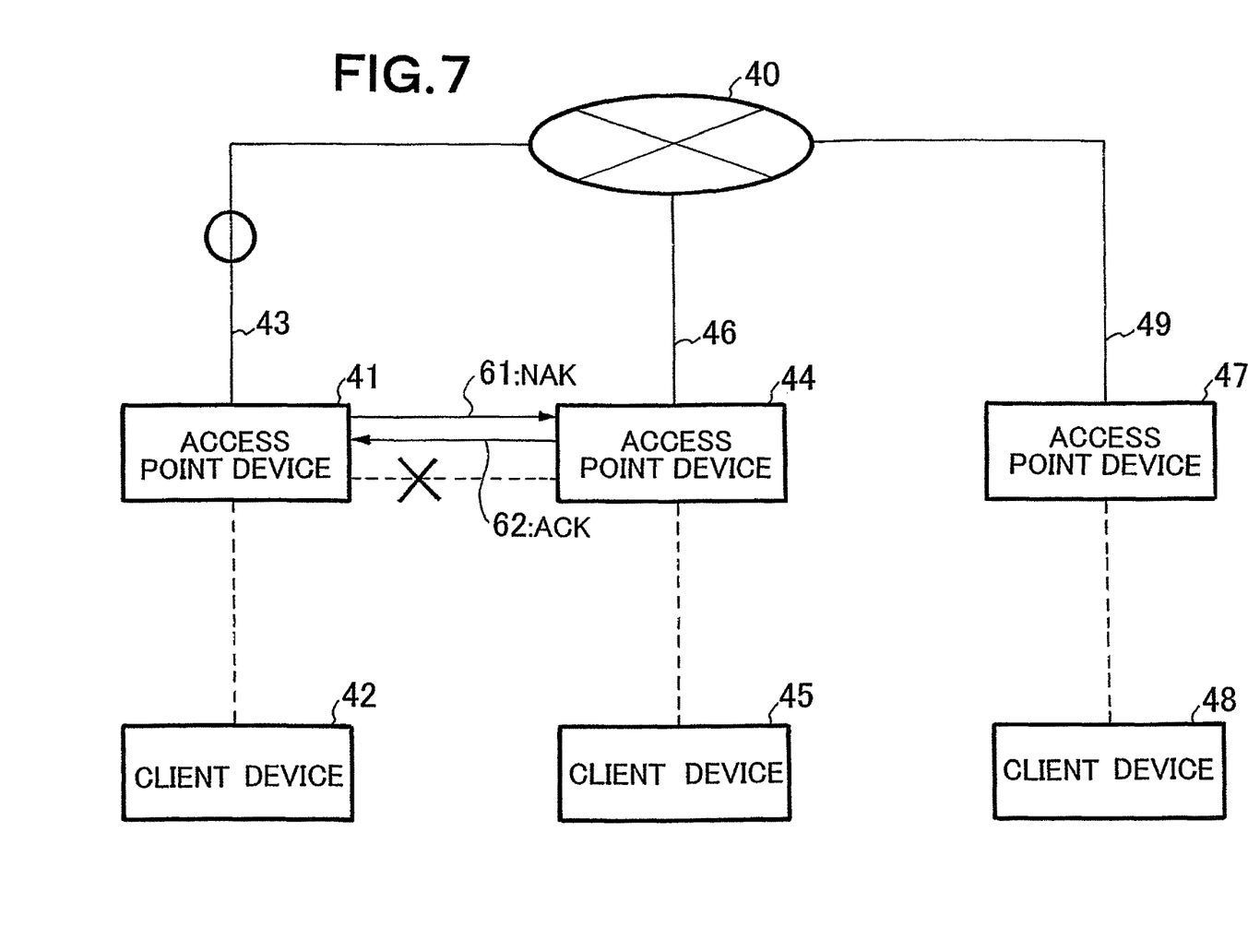
{FIG. 7} is an explanatory diagram of the operation related to the recovery notification according to the embodiment of the present invention.

In this example, since a fault also occurs on the path 46 to which the access point device 44 is connected, the access point device 44 operates as a relay node (step S33 in FIG. 6: "Relay"). After transmitting the ACK 82 to the access point device 41, the access point device 44 checks whether or not the path 46 to which the access point device 44 is connected is restored from the fault (step S35). As a result, if the path 46 is not recovered from the fault yet (step S36: No), the access point device 44 continues a process as the relay node and continues to be wirelessly connected to the access point device 47 serving as a proxy connection node.

An operation implemented by the system 100 if the path 46 to which the access point device 44 is connected is restored from the fault (step S36 in FIG. 6: Yes) will now be described with reference to the flowchart of FIG. 9. If detecting that the path 46 is restored from the fault, the access point device 44 transmits a recovery notification 83 (FIG. 8) to the access point device 47 serving as the proxy connection node (step S41).

Figure 9:
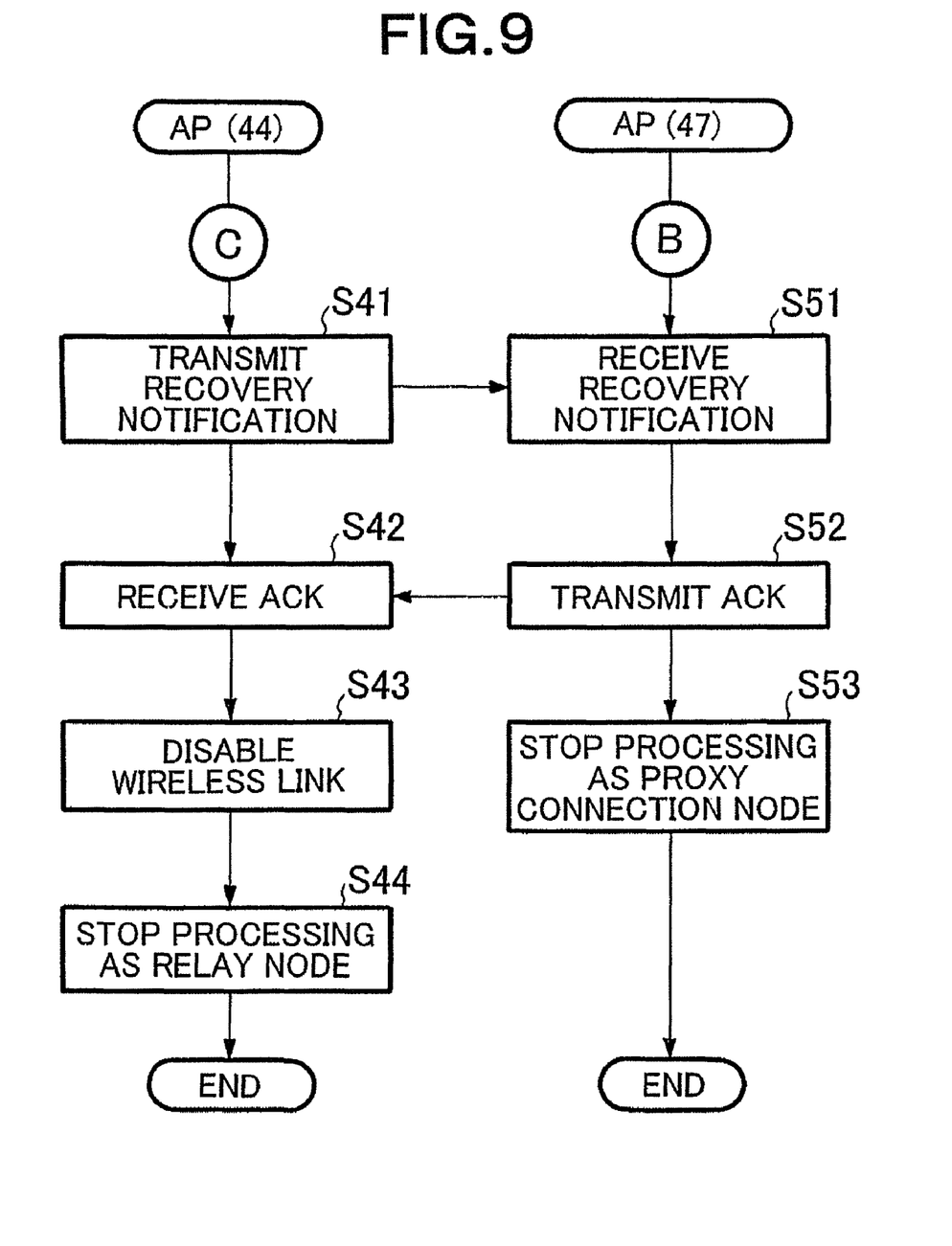
{FIG. 9} is a flowchart of the operation related to the recovery notification according to the embodiment of the present invention.

The access point device 47 that receives the recovery notification 83 (step S51) responds an ACK 84 to the access point device 44 (step S52) and stops a process as the proxy connection node (step S53). On the other hand, the access point device 44 that receives the ACK 84 from the access point device 47 (step S42) disables the wireless connection between the access points 44 and 47 and stops the process as the relay node (steps S43 and S44). The access point devices 44 and 47 thereby return to their original operation states, respectively.

According to the embodiment stated so far, when a connection fault occurs a path between the wired LAN infrastructure 40 and one of the access point devices, e.g., the access point device 41, a plurality of access point devices forms a mesh network. It is thereby possible to bridge a communication between the client device 41 connected to the access point device 41 and the wired LAN infrastructure 40 without using the path to which the fault occurs.

Moreover, even if a fault occurs on the wired LAN path 43, 46 or 49, the access point device 41, 44 or 47 directly connected to the client device 41, 45 or 48 connected to the fault path 43, 46 or 49 is not changed. Due to this, it is possible to avoid degradation in a communication quality due to a reduction in a field intensity resulting from roaming.

The present invention is not limited to the above-stated embodiment but he embodiment can be appropriately changed within a scope of the invention defined by claims that follows. For example, in the procedures described with reference to FIG. 5, if a fault occurs on the path 46 to which the access point device 44 is connected, the access point device 41 transmits the new portal request 73 to the access point device 47. Alternatively, the access point device 44 may transmit a portal request to the access point device 47. In this case, on the occasion of, for example, transmission of the NAK 72 to the access point 41, the access point device 44 transmits a portal request to the other access point device 47. In this way, by relaying the portal request among the access point devices until a proxy connection node is decided, it is possible to avoid transmitting the portal request from the sender, that is, the access point device 41 a plurality of times.

In another alternative, in FIG. 5, after transmitting the NAK 72, the access point device 44 may keep an original operation state without operating as the relay node, that is, a state of connecting the client device 45 to the wired LAN infrastructure 40 via the path 46. In this case, the client device 42 is connected to the wired LAN infrastructure 40 on a path via the access point devices 41 and 47.

In yet another alternative, the access point devices 41 and 44 may transmit different portal requests to the access point device 47, respectively.

Namely, in the system 100, as long as one or a plurality of relay nodes and one proxy connection node can form the mesh network, a portal request transmission method is not limited to the method including the above-stated procedures.

The present invention may be carried out as a computer program for causing the access point device 41, 44 or 47 to operate as stated above or as a recording medium in which the program is recorded.

The present invention is suited for enterprise use in which services should be continuously provided even if a fault occurs such as a wired LAN in a retail solution.

Although the exemplary embodiments of the present invention are described as mentioned above, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

The invention claimed is:

1. A method of securing a communication path of a client device by an access point device for a wireless LAN, the access point device connecting the client device in the wireless LAN to a wired LAN, the method comprising:
    monitoring a connection between the access point device and the wired LAN;
    if the monitored connection between the access point device and the wired LAN is not normal, transmitting to an adjacent access point device a portal request indicating a request for serving as a proxy connection node accessing the wired LAN;
    if the monitored connection between the access point device and the wired LAN is not normal, implementing a process as a relay node between the adjacent access point device and the client device; and
    when the access point device receives a portal request from the adjacent access point device, implementing a process as the proxy connection node indicated by the portal request sent from the adjacent access point device if the monitored connection between the access point device and the wired LAN is normal,
    wherein the access point device
        responds a negative acknowledgment indicating rejection of the portal request from the adjacent access point device, if the connection between the access point device and the wired LAN is not normal, and
        transmits a new portal request to other adjacent access point device, if the access point device receives a negative acknowledgment from the adjacent access point.

2. The method according to claim 1, wherein the access point device transmits a portal request to other adjacent access point device and implements a process as a relay node between the other adjacent access point device and the adjacent access point device receiving the negative acknowledgment, when the access point device responds the negative acknowledgment.

3. The method according to claim 1, further comprising:
transmitting a recovery notification for invalidating the transmitted portal request to the adjacent access point device and stopping implementing the process as the relay node, if the connection between the access point device and the wired LAN is restored; and
stopping implementing the process as the proxy connection node, if the access point device receives a recovery notification corresponding to the received portal request.

4. The method according to claim 2, wherein the access point device continues implementing the process as the relay node between the other adjacent access point device and the adjacent access point device receiving the negative acknowledgment, if the connection between the access point device and the wired LAN is not normal where the access point device receives a recovery notification for invalidating the transmitted portal request.

5. An access point device of a wireless LAN, the access point device connecting a client device in the wireless LAN to a wired LAN, the access point device comprising:
a LAN monitoring unit monitoring a connection between the access point device and the wired LAN;
a relay process unit which, if the monitored connection between the access point device and the wired LAN is not normal, transmits to an adjacent wireless access point device a portal request indicating a request for serving as a proxy connection node accessing the wired LAN and implements a process as a relay node between the adjacent access point device and the client device; and
a portal process unit which, when the access point device receives a portal request from the adjacent access point device, implements a process as the proxy connection node indicated by the portal request sent from the adjacent access point device if the monitored connection between the access point device and the wired LAN is normal, wherein
the portal process unit responds a negative acknowledgment indicating rejection of the portal request from the adjacent access point device, if the connection between the access point device and the wired LAN is not normal, and
the relay process unit transmits a new portal request to other adjacent access point device, if the access point device receives a negative acknowledgment from the adjacent access point.

6. The access point device according to claim 5, wherein the relay process unit transmits a portal request to other adjacent access point device and implements a process as a relay node between the other adjacent access point device and the adjacent access point device receiving the negative acknowledgment, when the access point device responds the negative acknowledgment.

7. The access point device according to claim 5, wherein the relay process unit transmits a recovery notification for invalidating the transmitted portal request to the adjacent access point device and stops implementing the process as the relay node, if the connection between the access point device and the wired LAN is restored, and
the portal process unit stops implementing the process as the proxy connection node, if the access point device receives a recovery notification corresponding to the received portal request.

8. The access point device according to claim 6, wherein the relay process unit continues implementing the process as the relay node between the other adjacent access point device and the adjacent access point device receiving the negative acknowledgment, if the connection between the access point device and the wired LAN is not normal where the access point device receives a recovery notification for invalidating the transmitted portal request.

9. A non-transitory computer-readable medium having stored therein a program used for an access point device for a wireless LAN, the access point device connecting a client device in the wireless LAN to a wired LAN, the program causing a computer of the access point device to execute steps of:
monitoring a connection between the access point device and the wired LAN;
if the monitored connection between the access point device and the wired LAN is not normal, transmitting to an adjacent access point device a portal request indicating a request for serving as a proxy connection node accessing the wired LAN;
if the monitored connection between the access point device and the wired LAN is not normal, implementing a process as a relay node between the adjacent access point device and the client device; and
when the access point device receives a portal request from the adjacent access point device, implementing a process as the proxy connection node indicated by the portal request sent from the adjacent access point device if the monitored connection between the access point device and the wired LAN is normal,
wherein the access point device
responds a negative acknowledgement indicating rejection of the portal request from the adjacent access point device, if the connection between the access point device and the wired LAN is not normal, and
transmits a new portal request to other adjacent access point device, if the access point device receives a negative acknowledgement from the adjacent access point.

10. The non-transitory computer-readable medium according to claim 9, wherein the access point device transmits a portal request to other adjacent access point device and implements a process as a relay node between the other adjacent access point device and the adjacent access point device receiving the negative acknowledgement, when the access point device responds the negative acknowledgement.

11. The non-transitory computer-readable medium according to claim 10, the program further causing the computer as the access point device to execute steps of:
transmitting a recovery notification for invalidating the transmitted portal request to the adjacent access point device and stopping implementing the process as the relay node, if the connection between the access point device and the wired LAN is restored; and
stopping implementing the process as the proxy connection node, if the access point device receives a recovery notification corresponding to the received portal request.

12. The non-transitory computer-readable medium according to claim 9, wherein the access point device continues implementing the process as the relay node between the other adjacent access point device and the adjacent access point device receiving the negative acknowledgement, if the connection between the access point device and the wired LAN is not normal where the access point device receives a recovery notification for invalidating the transmitted portal request.

* * * * *